United States Patent
Kountouris

(10) Patent No.: US 9,854,334 B2
(45) Date of Patent: Dec. 26, 2017

(54) METHOD AND DEVICE FOR MANAGING TRANSMISSIONS OF MEASUREMENTS PERIODICALLY CARRIED OUT BY A SENSOR

(75) Inventor: Apostolos Kountouris, Grenoble (FR)

(73) Assignee: ORANGE, Paris (FR)

( * ) Notice: Subject to any disclaimer, the term of this patent is extended or adjusted under 35 U.S.C. 154(b) by 998 days.

(21) Appl. No.: 13/517,489

(22) PCT Filed: Dec. 20, 2010

(86) PCT No.: PCT/FR2010/052821
§ 371 (c)(1),
(2), (4) Date: Jul. 12, 2012

(87) PCT Pub. No.: WO2011/083248
PCT Pub. Date: Jul. 14, 2011

(65) Prior Publication Data
US 2012/0278044 A1    Nov. 1, 2012

(30) Foreign Application Priority Data

Dec. 21, 2009   (FR) ...................................... 09 59294

(51) Int. Cl.
*H04Q 9/00* (2006.01)
*H04L 29/08* (2006.01)

(52) U.S. Cl.
CPC .............. *H04Q 9/00* (2013.01); *H04L 67/12* (2013.01); *H04L 67/325* (2013.01); *H04Q 2209/60* (2013.01); *H04Q 2209/826* (2013.01)

(58) Field of Classification Search
CPC .. G06F 15/00; G06F 1/28; G06F 1/30; H04W 12/06; H04Q 2209/60; H04Q 2209/00; H04Q 2209/826; H04L 67/325

USPC .......................... 702/189; 700/292; 340/657
See application file for complete search history.

(56) References Cited

U.S. PATENT DOCUMENTS

| 6,195,018 B1 * | 2/2001 | Ragle ..................... G08C 15/06 340/870.01 |
| 2009/0135018 A1 * | 5/2009 | Veillette et al. .............. 340/657 |
| 2010/0274872 A1 * | 10/2010 | Harrang ................ H04L 1/0002 709/217 |

FOREIGN PATENT DOCUMENTS

WO    2009078519 A1    6/2009

OTHER PUBLICATIONS

French Search Report and Written Opinion dated Jun. 25, 2010 for corresponding French Application No. 0959294, filed Dec. 21, 2009.

(Continued)

*Primary Examiner* — Mohamed Charioui
*Assistant Examiner* — Catherine Rastovski
(74) *Attorney, Agent, or Firm* — David D. Brush; Westman, Champlin & Koehler, P.A.

(57) ABSTRACT

A method and device are provided for managing transmissions of a plurality of sets of measurements performed periodically by a measurement sensor capable of communicating with a collection device via a radio network. The method determines, according to a random distribution law, a date of transmission for each set of measurements of the plurality and transmits a message relating to at least one set of measurements, on one of the dates of transmission determined for the plurality.

15 Claims, 6 Drawing Sheets

(56) References Cited

OTHER PUBLICATIONS

International Preliminary Report on Patentability and English Translation of the Written Opinion dated Aug. 7, 2012 for corresponding International Application No. PCT/FR2010/052821, filed Dec. 20, 2010.
International Search Report and Written Opinion dated Apr. 15, 2012 for corresponding International Application No. PCT/FR2010/052821, filed Dec. 20, 2010.

* cited by examiner

METHOD AND DEVICE FOR MANAGING TRANSMISSIONS OF MEASUREMENTS PERIODICALLY CARRIED OUT BY A SENSOR

CROSS-REFERENCE TO RELATED APPLICATIONS

This Application is a Section 371 National Stage Application of International Application No. PCT/FR2010/052821, filed Dec. 20, 2010, which is incorporated by reference in its entirety and published as WO 2011/083248 on Jul. 14, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of sensor networks, in particular that of the remote measurement applications for which a collection element collects the measurements performed by a plurality of sensors.

BACKGROUND OF THE DISCLOSURE

Known large-scale telemetry systems are based on the mobile communications network of GSM (Global System for Mobile Communications) type. These systems are, for example, systems for reading water, electricity or gas meters or even systems for monitoring resources of a community such as irrigation, pollution, parking spaces, etc.

In these systems, the sensors are equipped with a GSM communication module and transmit measurement readings at regular intervals to a base station capable of processing the information received.

Depending on the systems, the information is either transmitted following a request sent regularly by the base station, or transmitted directly by the sensors.

The information may be encrypted to ensure its confidentiality.

The encryption techniques protect the content of the information but are ineffective against interception and scrambling attacks.

There are, moreover, techniques for protecting against scrambling, notably in the military field. Such techniques are applied to the communication protocol used on a communication link at the physical layer level. One known technique consists, for example, in spreading the spectrum. Such a modification applied to a standardized protocol, such as, for example, the GSM protocol, requires an adaptation of the standard.

These techniques are too complex and too costly to be implemented in a telemetry system comprising a large number of sensors.

There is therefore a need for a simple solution for protecting a telemetry system against interception and/or scrambling attacks.

SUMMARY

An embodiment of the invention relates to a method for managing transmissions of a plurality of sets of measurements performed periodically by a measurement sensor capable of communicating with a collection device via a radio network, characterized in that it comprises:
  a step for determining, according to a random distribution law, a date of transmission for each set of measurements of the plurality;
  a step of transmitting a message relating to at least one set of measurements, on one of the dates of transmission determined for the plurality.

Messages relating to measurements performed periodically by the sensor are exchanged between the collection device and the sensor on non-periodic dates, dissociated from the measurement dates. This makes it possible to reinforce the robustness of the communication link between the sensor and the collection device.

Thus, in effect, a scrambling or interception device does not know when the measurement reports will be sent without scrambling or listening to the link permanently. It will thus consume more energy. An embodiment of the invention therefore makes it possible to make the scrambling and/or the interception of the measurement data more complex. An embodiment of the invention does not require any modification of the communication protocol.

Furthermore, the increase in scrambling time makes the scrambler more vulnerable inasmuch as it can be detected more easily by the telemetry system.

According to one embodiment of the management method of the invention, the message relating to the set of measurements is a message comprising a measurement report relating to the set of measurements performed by the sensor.

This embodiment is simple to implement in a sensor of a telemetry system in which the remote collection device is permanently listening for the messages originating from different sensors. A measurement report stored on each measurement is transmitted on a date of transmission dissociated from the date of the measurement. The dissociation of the date of transmission and the date of measurement makes the interception and/or the scrambling of the measurement reports more difficult.

The method can be implemented in the existing systems, for example by downloading.

Furthermore, the inclusion of sensors according to an embodiment of the invention in an existing telemetry system can be gradual. In practice, the telemetry system can operate with sensors that do not implement the method and sensors that do implement the method.

According to another embodiment of the management method of the invention, the message relating to the set of measurements is a measurement report request.

This embodiment is suitable for the telemetry systems in which the measurement reports from the sensors are transmitted by the sensors following a request from a collection device. The method is, in this case, implemented in the collection device. The transmission by the collection device of a message relating to at least one set of measurements to a sensor causes the transmission, if possible immediate, by the sensor of at least one measurement report. Since the dates of transmission of the messages are non-periodic and dissociated from the measurement dates, the measurement reports are also transmitted non-periodically. Thus, the forecasting of the dates of transmission of the messages, and consequently of the measurement reports, cannot be predicted, complicating the interception and/or scrambling action.

Since the implementation is done only on the collection device, it is inexpensive.

According to a particular embodiment of the management method of the invention, the message relating to a set of measurements is transmitted on the date of transmission determined for said set of measurements.

Since the scheduling of the transmissions is very simple, this embodiment presents the advantage of being simple to implement.

According to another particular embodiment of the management method of the invention, the message relating to a set of measurements is transmitted on the date of transmission determined for a preceding set of measurements.

This embodiment makes it possible to send measurement reports in a scattered order relative to the order in which the measurements are taken.

According to one embodiment, the message relates to at least one first and one second sets of measurements and is transmitted on one of the dates determined for one of these two sets of measurements.

Thus, a number of measurement reports are transmitted in one and the same message.

This makes it possible to limit the number of messages transmitted. The non-regularity of the size and of the format of the content of the messages helps to make analyzing the messages which could be intercepted difficult.

According to an embodiment used in combination with the preceding embodiment, the method also comprises a step of transmitting a message relating to a false set of measurements and/or to a set of redundant measurements on another of the dates determined for one of these two sets of measurements.

The transmission of "false" messages and/or of redundant messages makes it possible to induce a possible hacker to make errors.

According to another embodiment, no message is transmitted on another of the dates determined for one of these two sets of measurements.

Reducing the total number of messages transmitted makes it possible to reduce the consumption of the equipment, and notably that of the sensors.

The grouping together of measurement reports also makes it possible to reduce the number of messages transmitted and thus to reduce the activity on the communication link.

According to a particular feature of the management method of an embodiment of the invention, the random distribution law is a uniform distribution law over a predetermined time window.

The uniform selection offers a maximum uncertainty as to the anticipation of the transmissions. The choice of a time window greater than the measurement period results in an overlapping of the time windows which makes it possible to increase this uncertainty.

According to another particular characteristic of the management method of an embodiment of the invention, the random distribution law is an exponential distribution law over a predetermined time window.

The application of an exponential distribution law makes it possible to set the transmission activity by setting a single parameter, the rate of transmission per unit of time. This embodiment allows for a strong decorrelation between the measurement instants and the transmission instants.

An embodiment of the invention also relates to a device for managing transmissions of a plurality of sets of measurements performed periodically by a measurement sensor capable of communicating with a collection device via a radio network, characterized in that it comprises means for determining, according to a random distribution law, a date of transmission for each set of measurements of the plurality and means for transmitting a message relating to at least one set of measurements, on one of the dates of transmission determined for the plurality.

Such a device can easily be integrated in a sensor or in a collection device. It can also be an independent device capable of communicating with a sensor or with a collection device.

An embodiment of the invention also relates to a sensor comprising a management device as described previously.

An embodiment of the invention is simple to implement inasmuch as the sensor already comprises a timer, a microcontroller and information storage means.

An embodiment of the invention also relates to a collection device comprising a management device as described previously.

An embodiment of the invention finally relates to a computer program product comprising instructions for implementing the steps of the method for managing transmissions of a plurality of sets of measurements as described previously, when it is loaded and run by a processor.

BRIEF DESCRIPTION OF THE DRAWINGS

Other features and advantages will become apparent from the following description of embodiments given as nonlimiting examples, with reference to the appended drawings in which.

DETAILED DESCRIPTION OF ILLUSTRATIVE EMBODIMENTS

A first embodiment of the invention will now be described with reference to FIGS. 1 to 3.

Figure 1:
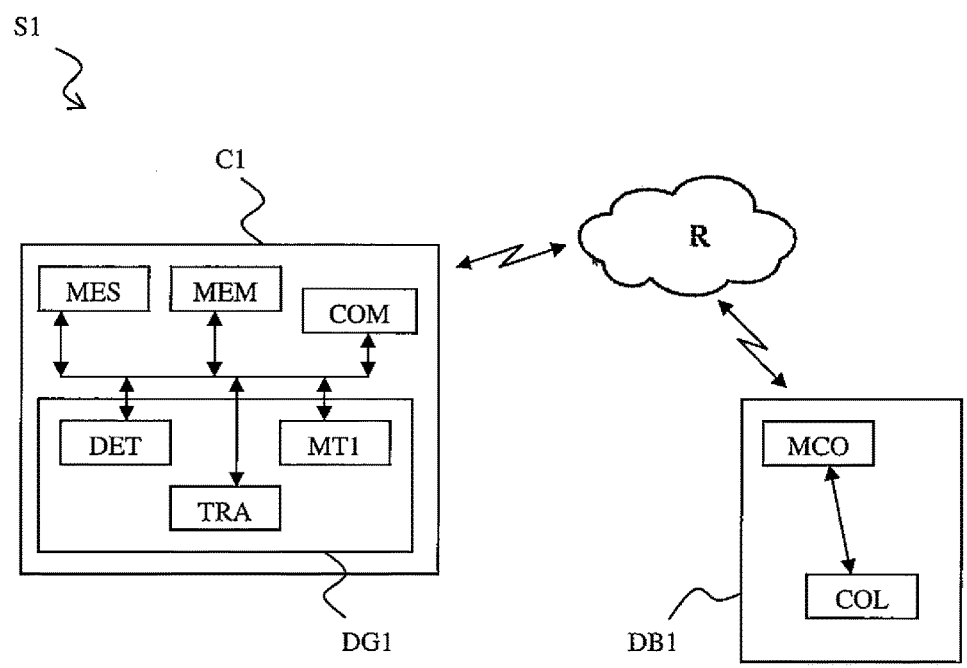
FIG. 1 is a diagram illustrating a first telemetry system of the invention according to a first embodiment.
Figure 2:
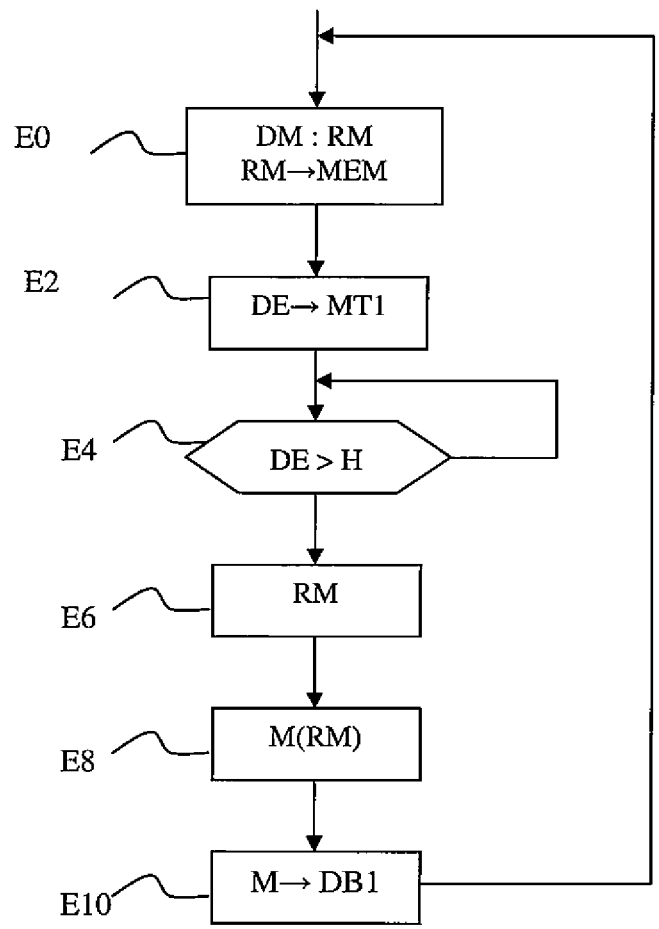
FIG. 2 is a flow diagram illustrating the various steps of a management method implemented in a first system according to a first embodiment.

With reference to FIG. 1, a telemetry system S1 comprises a collection device DB1 and a sensor C1 which can communicate via a radio communication network R.

The network R is a wireless communication network, for example of GSM type.

The collection device DB1 comprises a communication module MCO capable of transmitting and receiving data via the communication network R and a processing module COL capable of collecting data originating from the sensor C1 and of processing the data.

As an alternative, the system S1 comprises a plurality of sensors and the module COL of the collection device DB1 is capable of processing the data transmitted by the different sensors and received by the communication module MCO.

In the embodiment described here, the collection device DB1 is permanently listening for data from the sensor C1.

The sensor C1 comprises a measurement module MES, a communication module COM, a measurement memory MEM and a management device DG1.

The measurement module MES is capable of periodically performing a set of measurements at regular intervals T and of storing the result of these measurements in the measurement memory MEM in association with the measurement date.

As an alternative, the measurement date is not stored in association with the measurements in the memory MEM.

The period T between two consecutive measurements is predetermined according to the type of application.

A set of measurements comprises one or more measurements.

For example, the measurement module MES is capable of reading, on the one hand, a first meter indicating a number of kilowatts corresponding to a first period of a day, called "off-peak period" and, on the other hand, a second meter indicating a number of kilowatts corresponding to a second period of the day, called "peak period".

The communication module COM is capable of communicating with the communication module MCO of the collection device DB1 via the radio network R.

The management device DG1 comprises a determination module DET, a processing module TRA and a memory MT1.

A first embodiment of the management method of the invention implemented in the system S1 will now be described with reference to FIGS. 2 and 3.

In a first step E0, on a measurement date DM, the measurement module MES of the sensor C1 measures a set of measurements EM and stores in the memory MEM a measurement report RM containing the set of measurements EM in association with the measurement date DM.

The step E0 is followed by a step E2 in which the determination module DET determines a date of transmission DE for the set of measurements EM and stores it in the memory MT1.

In the embodiment described, the date of transmission DE is a random value determined in a time window of predetermined length T, from the time of occurrence DM of the corresponding measurement.

The random value is, for example, determined on the basis of a uniform probabilities distribution law over a time window of length T.

Thus, the date of transmission DE is located in the time interval [DM, DM+T].

Alternatively, the length of the time window is greater than or less than the period T between measurements.

In a step E4, the processing module TRA of the management device DG1 reads the date of transmission DE in the memory MT1 and compares it to the current date H.

If the date of transmission DE is greater than the current date H, the step E4 is reiterated.

Otherwise, in a step E6, the processing module TRA accesses the memory MEM and reads the measurement report RM therein.

The step E6 is followed by a step E8 in which the processing module TRA composes a message M comprising the measurement report RM.

The message M is, for example, a message of SMS (short message service) type.

Alternatively, the message M is established according to another communication protocol.

Then, in a next step E10, the processing module TRA transmits the message M to the collection device DB1 via the communication module COM and the network R.

The steps E0 to E10 are then reiterated for the subsequent time windows.

The step E0 is performed at the start of each time period T. If necessary to observe this delay, the steps E0 and E2 on the one hand and the steps E4 to E10 on the other hand are performed in parallel.

Figure 3:
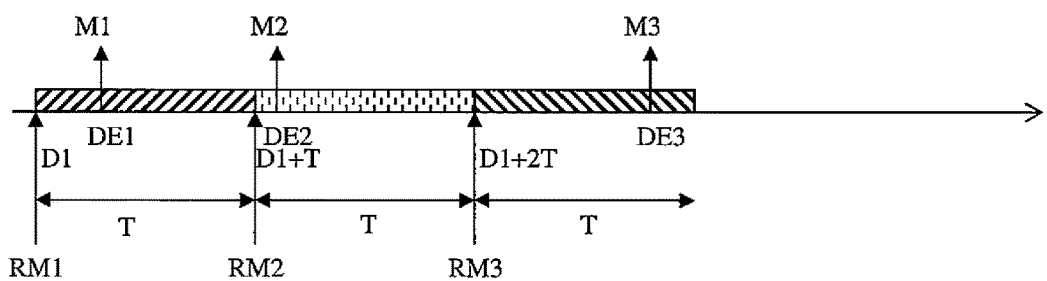
FIG. 3 is a time diagram illustrating the first embodiment of the invention.

FIG. 3 is a diagram illustrating an example of measurement dates and of associated dates of transmission.

A first measurement report RM1 is stored on the date D1 and a first date of transmission DE1 is determined in the time interval [D1,D1+T]. A second measurement report RM2 is stored on the date D1+T and a second date of transmission DE2 is determined in the time interval [D1+T,D1+2T]. A third measurement report RM3 is stored on the date D1+2T and a third date of transmission DE3 is determined.

A message M1 containing the measurement report RM1 is transmitted on the date of transmission DE1, a message M2 containing the measurement report RM2 is transmitted on the date of transmission DE2, a message M3 containing the measurement report RM3 is transmitted on the date of transmission DE3.

The measurement reports RM1, RM2, etc. stored periodically are not transmitted periodically.

Figure 4:
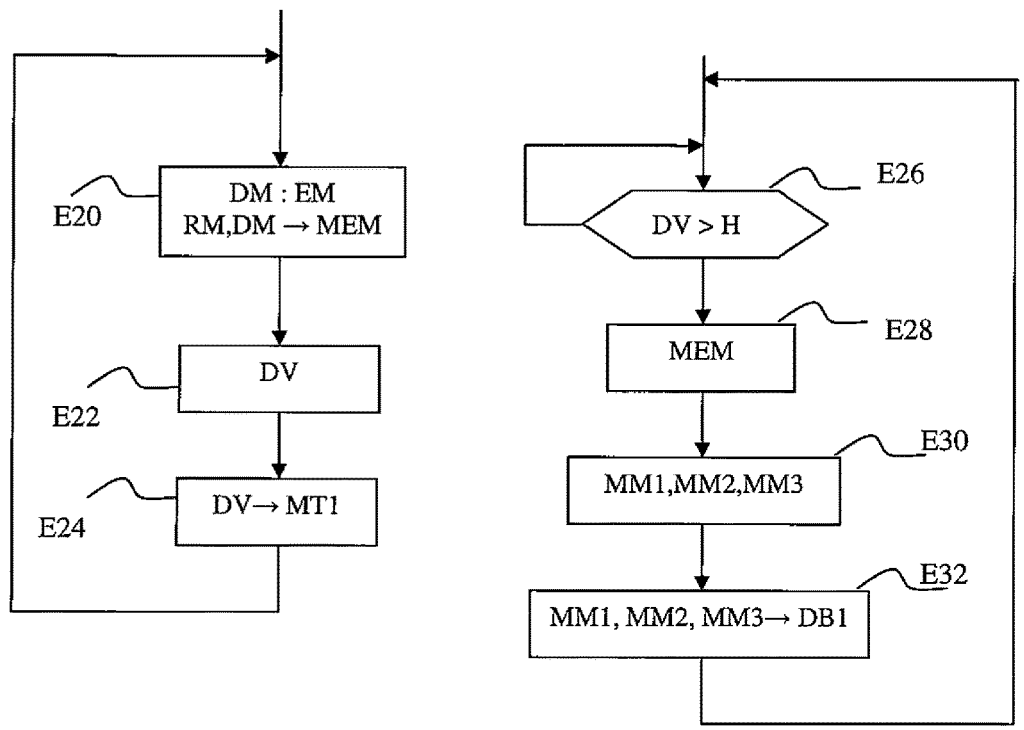
FIG. 4 is a flow diagram illustrating the various steps of a management method implemented in the first system according to a second embodiment.

A second embodiment of the management method of the invention implemented in the system S1 will now be described with reference to FIGS. 4 and 5.

In a first step E20, on a date DM, the measurement module MES of the sensor C1 measures a set of measurements EM and stores in the memory MEM a measurement report RM containing the set of measurements EM in association with the date DM.

The step E20 is followed by a step E22 in which the determination module DET determines a date of transmission DV for the set of measurements EM.

In the embodiment described, the date of transmission DV is a random value determined in a time window of predetermined length Td greater than the period T between measurements, and beginning at the instant of occurrence DM of the corresponding measurement EM. The random value is, for example, determined on the basis of a uniform probabilities distribution law over the time window Td.

Thus, the date of transmission DV determined for the first set of measurements EM is located in the time interval [DM, DM+Td].

Alternatively, the time window begins at a different instant from the instant of occurrence DM of the corresponding measurement. For example, the time window begins on the date of transmission of the preceding measurement.

Also, alternatively, the time windows have a length less than the period T between measurements. In this case, the time windows can be unconnected.

In a following step E24, the date of transmission DV is stored in the memory MT1. The memory MT1 thus contains at least one date of transmission DV.

The steps E20 to E24 are reiterated at regular time intervals T.

In a step E26, executed in parallel with the steps E20 to E24, the processing module TRA of the management device DG1 compares the current time H to the date(s) of transmission DV stored in the memory MT1.

Alternatively, in the step E24, the dates of transmission are arranged in the memory MT1 in order of occurrence and, in the step E26, the processing module TRA of the management device DG1 compares the current time H to the date of transmission DV located in the first position in the memory MT1.

If the date of transmission DV is greater than the current date H, the step E26 is reiterated.

Otherwise, in a step E28, the processing module TRA accesses the memory MEM.

If the memory MEM contains a single measurement report to be transmitted, the step E28 is followed by a step E30 during which the processing module TRA composes a message MM1 comprising this measurement report.

If the memory MEM contains a number of measurement reports to be transmitted, the processing module TRA, in the step E30, selects these measurement reports and composes a message MM2 comprising the selected measurement report(s).

Alternatively, in the case where a number of measurement reports are selected, the selected measurement reports are aggregated by an aggregation function and the message MM2 comprises the result of the aggregation. This is a way to reduce the length of the message MM2.

Alternatively, only the measurement report corresponding to the date of transmission is selected.

Again alternatively, only the measurement report for which the associated measurement date is the oldest is selected.

If the memory MEM contains no measurement report to be sent, a message MM3 composed in the step E30 is a message that does not include any measurement report or that includes a message containing false measurements. In this case, the collection device DB1 is capable of determining that the measurements contained in this message MM3 must not be taken into account.

Alternatively, no message is sent if the memory MEM does not contain any measurement report to be transmitted.

Also, alternatively, the message MM3 is a redundant message containing one or more measurement reports that have already been transmitted.

Then, in a subsequent step E32, the processing module TRA transmits the constructed message MM1, MM2 or MM3 to the collection device DB1 via the communication module COM and the network R.

The steps E26 to E32 are then reiterated with the following dates of transmission DV.

Figure 5:
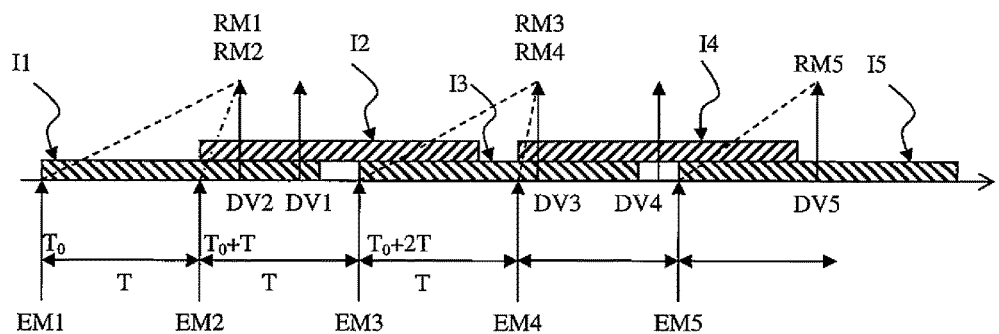
FIG. 5 is a time diagram illustrating the second embodiment of the invention.

FIG. 5 represents a time diagram illustrating an example of how the second embodiment is produced.

Measurements EM1, EM2 EM3, etc. are performed respectively at the instants $T_0$, $T_0+T$, $T_0+2T$ etc., and measurement reports RM1, RM2, RM3, etc. are stored for these measurements.

Dates of transmission DV1, DV2, DV3, etc. relating to each of the measurements are determined as the measurements are taken.

On the date $T_0$, a measurement EM1 is performed and a date DV1 is determined over an interval I1. The interval I1 is a time window $[T_0, T_0+Td]$ of length Td.

On the date $T_0+T$, a measurement EM2 is performed and a date DV2 is determined on an interval I2. In this example, the date DV2 is earlier than the date DV1.

On the date DV2, two available reports RM1 and RM2 in the memory MEM are transmitted.

On the date DV1, no measurement report is available and no message is transmitted.

On the date $T_0+2T$, a measurement EM3 is performed, a measurement report RM3 corresponding to the measurement EM3 is stored and a date DV3 is determined on an interval I3.

On the date $T_0+3T$, a measurement EM4 is performed, a measurement report RM4 corresponding to the measurement EM4 is stored and a date DV4 is determined on an interval I4.

On the date DV3, 2 measurement reports RM3 and RM4 are transmitted.

On the date DV4, no measurement report is transmitted.

On the date $T_0+4T$, a measurement EM5 is performed, a measurement report RM5 corresponding to the measurement EM5 is stored and a date DV5 is determined on an interval I5.

On the date DV5, the measurement report RM5 is transmitted.

The successive time windows I1, I2 . . . I5 overlap.

The measurement reports are not transmitted periodically. Furthermore, the size and the format of the content of the messages transmitted is variable. It is therefore not possible to determine in advance the date and the duration of transmission of a measurement report.

A second embodiment of the invention will now be described with reference to FIGS. 6 to 8.

Figure 6:
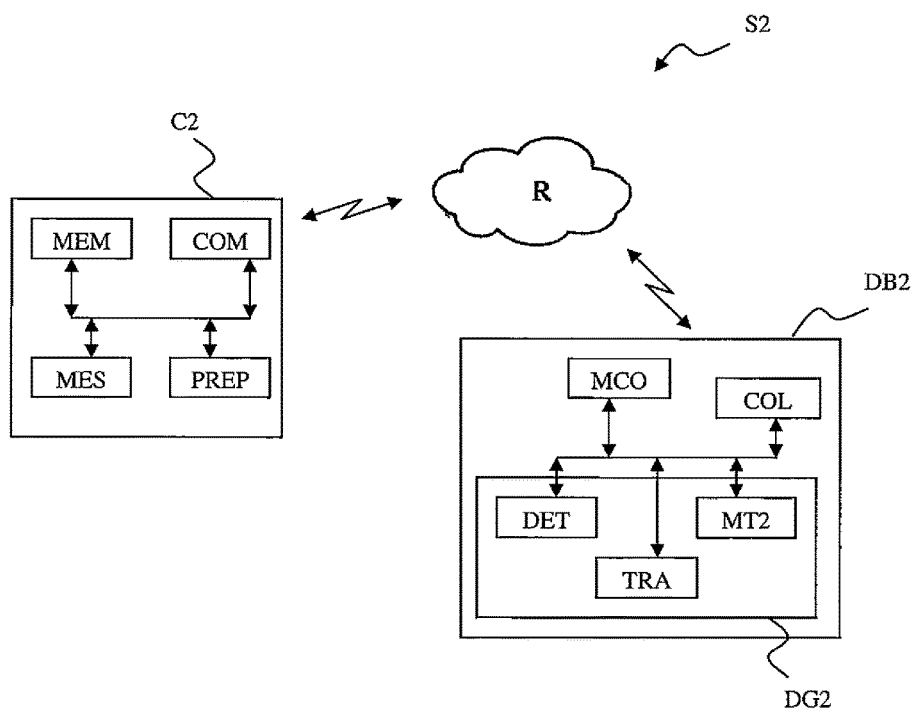
FIG. 6 is a diagram illustrating a second telemetry system of the invention according to a second embodiment.
Figure 7:
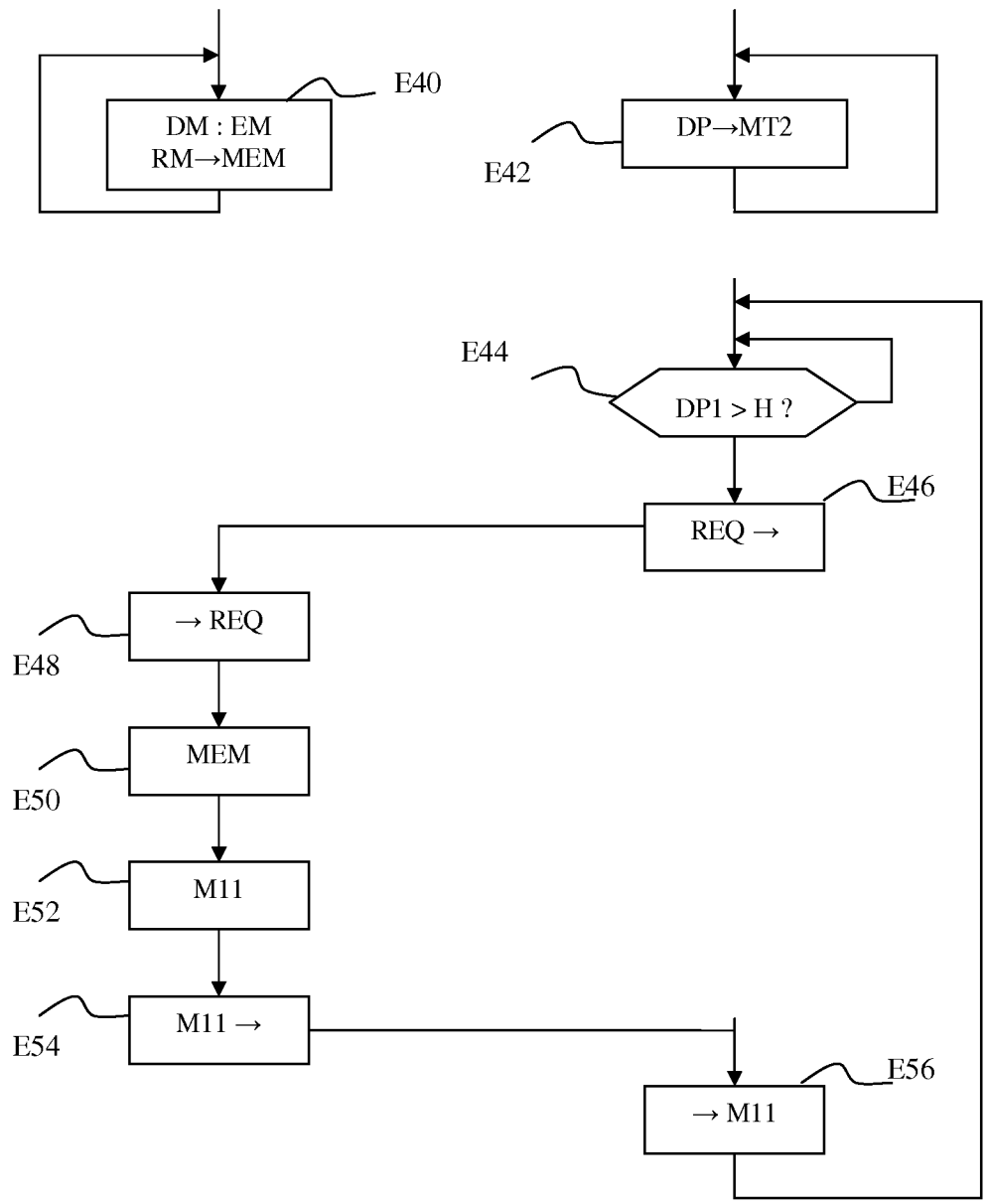
FIG. 7 is a flow diagram illustrating the various steps of a management method implemented in the second system according to one embodiment.

With reference to FIG. 6, a second telemetry system S2 comprises a collection device DB2 and a sensor C2 which are capable of communicating via a radio communication network R.

The sensor C2 comprises a measurement module MES, a message preparation module PREP, a communication module COM and a measurement memory MEM.

The measurement module MES is capable of periodically performing a set of measurements and of storing a measurement report comprising this set of measurements in the measurement memory MEM in association with the date of the measurements.

Alternatively, the measurement report does not comprise the measurement date.

The collection device DB2 comprises a communication module MCO, a collection module COL capable of processing data originating from the sensor C2 and a management device DG2.

The communication module COM is capable of communicating with the communication device MCO of the collection device DB2 via the communication network R.

The management device DG2 comprises a determination module DET, a processing module TRA and a memory MT2.

An embodiment of the management method of the invention implemented in the second system S2 will now be described with reference to FIGS. 7 and 8.

In a first step E40, on a date DM, the measurement module MES of the sensor C2 performs a set of measurements EM and stores in the memory MEM a measurement report RM containing the set of measurements EM in association with the date D1.

The step E40 is reiterated at regular time intervals T.

Figure 8:
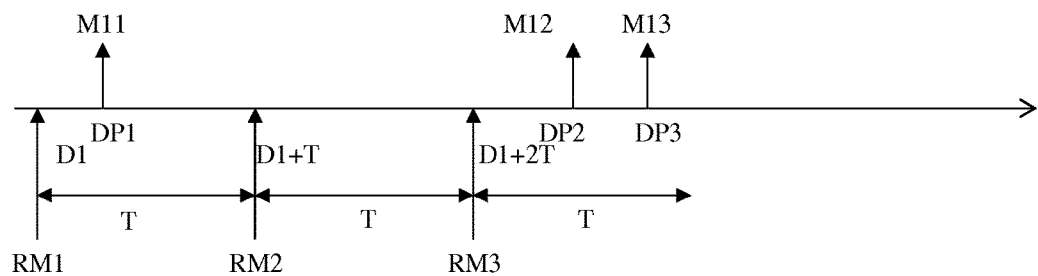
FIG. 8 is a time diagram illustrating one embodiment of the invention.

Thus, as illustrated in FIG. 8, measurement reports RM1, RM2, RM3, etc. are stored respectively in association with the dates $T_0$, $T_0+T$, $T_0+2T$, etc.

In a step E42, the determination module DET determines a date of transmission DP and stores it in the memory MT2 of the management device DG2.

In the embodiment described, the date of transmission DP is a random value determined on the basis of a law of probability that decreases exponentially as a function of a predetermined parameter λ. The parameter λ represents, for example, a rate of transmission per unit of time.

The date of transmission DM is, for example, determined over a time window determined as a function of a preceding date of transmission and of a rate of decease determined by an average number of events per time unit λ.

Thus, the date of transmission DP determined for the set of measurements EM is situated in a time interval ranging from an instant Tm to infinity, with a greater probability at the start of the interval.

The instant Tm is determined as a function of the previously calculated date of transmission, the first date being predetermined. For example, the instant Tm corresponds to the date of transmission DM to which a predetermined delay has been added.

Alternatively, the instant Tm is determined as a function of a number of previously calculated dates of transmission.

Also, alternatively, the instant Tm is determined as a function of the associated measurement date DM.

Alternatively, the time interval is between Tm and a predetermined maximum value Tmax, for example corresponding to three measurement periods T. In this case, the determined date of transmission DM is set at Tmax if the result of the exponential function is greater than the value Tmax.

Also alternatively, the instant Tm is determined as a function of Tmax.

The step E42 is reiterated at regular time intervals, for example the period between measurements T.

Thus, the dates of transmission DP1, DP2, DP3, etc. are determined.

In a step E44, executed in parallel with the step E42, the processing module TRA of the management device DG2 compares the date of transmission DP1 to the current date H.

If the date of transmission DP1 is greater than the current date H, the step E44 is reiterated.

Otherwise, in a step E46, the processing module TRA sends a measurement request REQ to the sensor C2, via the communication module MCO.

The request REQ is received by the communication module COM of the sensor C2 in a step E48.

Then, in a step E50, the message preparation module PREP of the sensor C2 accesses the memory MEM and reads the first measurement report RM1 therein.

The step E50 is followed by a step E52 during which the message preparation module PREP composes a message M11 comprising the first measurement report RM1.

Then, in a following step E54, the message preparation module PREP transmits to the collection device DB2, in response to the request REQ, the message M11 via the communication module COM and the network R.

The message M11 is received by the communication module MCO of the collection device DB2 and transmitted for processing to the collection module COL (step E56).

The steps E44 to E56 are then reiterated with the following dates of transmission DP2, DP3, etc.

Thus, a message M12 containing the measurement report RM2 and the measurement report RM3 is transmitted by the sensor C2 following the reception of a request sent by the collection device DB2 on the date of transmission DP2, a message M13 containing an erroneous measurement report is transmitted by the sensor C2 following the reception of a request sent by the collection device DB2 on the date of transmission DP3, and so on.

Although the measurement reports are established regularly in all periods, these measurement reports are transmitted according to a random law making it impossible to predict a date of transmission.

The distribution law used to determine the dates of transmission in the embodiments described is either a uniform distribution law, or an exponential distribution law. Alternatively, another distribution law may be used.

Figure 9:
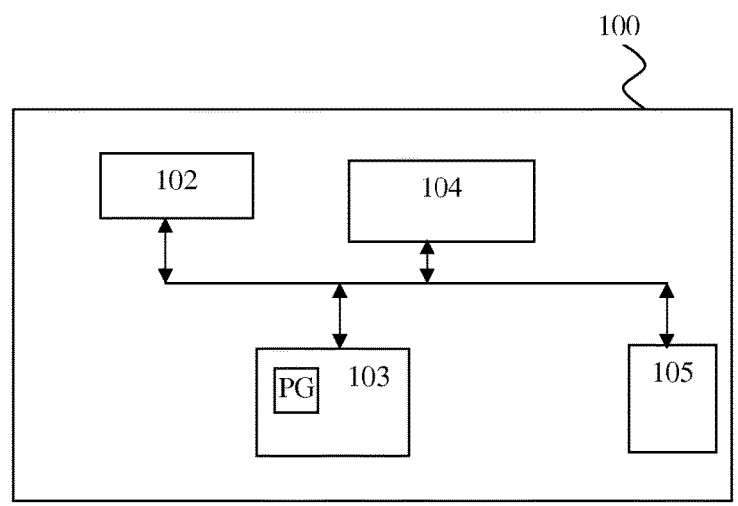
FIG. 9 is a block diagram representing a device suitable for implementing the steps of a management method according to one embodiment of the invention.

According to an embodiment chosen and represented in FIG. 9, a management device implementing a management method according to the invention is, for example, a device 100 which comprises, as is known, in particular a processing unit 102 equipped with a microprocessor, a read-only memory of ROM or EEPROM type 103, a random-access memory of RAM type 104, a communication interface 105 with a communication network R.

The device 100 also has means for accessing a measurement memory of an associated sensor or of an associated collection device. For example, the management device is capable of dialoging with the sensor or the collection device via a communication module (not represented) by wired or wireless link.

The read-only memory 103 comprises registers storing a computer program PG comprising program instructions suitable for performing the steps of a management method according to an embodiment of the invention.

On power up, the program PG stored in the EEPROM-type memory 103 is transferred into the random-access memory which will then contain an executable code as well as registers for storing the variables needed to implement a step of determining, according to a random distribution law, a date of transmission for each set of measurements of the plurality and a step of transmitting a message relating to at least one set of measurements, on one of the dates of transmission determined for the plurality.

More generally, a storage device, which can be read by a computer or by a microprocessor, which may or may not be integrated in the device, and which may or may not be removable, stores a program implementing the steps of a management method according to an embodiment of the invention.

The invention claimed is:

1. A method comprising:
managing transmissions of a plurality of sets of measurements performed iteratively by a measurement sensor communicating with a collection device via a radio network, each set of measurements being performed with a respective iteration at a regular time interval, wherein managing comprises the following acts performed by the measurement sensor:
for each set of measurements, determining a respective date of transmission for that set of measurements, the determination of said respective date of transmission for each set of measurements comprising a determination of a time window starting from an instant which is a function of a measurement date of one of said sets of measurements, or a function of a determined respective date of transmission of a preceding set of measurements of the plurality of sets of measurements, and a determination of a random value according to a random distribution law over said window, said respective date of transmission being said random value, wherein the determined time window has a length that is greater than said regular time interval; and
transmitting by the measurement sensor a message relating to at least one set of measurements over the radio network, on one of the respective dates of transmission determined for the plurality of sets of measurements, wherein the message comprises a measurement report relating to the at least one set of measurements performed by the measurement sensor.

2. The management method as claimed in claim 1, wherein the message relating to the set of measurements is a message comprising a measurement report relating to the set of measurements performed by the measurement sensor.

3. The management method as claimed in claim 1, wherein the message relating to the set of measurements is a request for a measurement report.

4. The management method as claimed in claim 1, wherein the message relating to the at least one set of measurements of said plurality of sets of measurements is transmitted on the respective date of transmission determined for said set of measurements.

5. The management method as claimed in claim 1, wherein the message relating to a set of measurements is transmitted on the respective date of transmission determined for the preceding set of measurements.

6. The management method as claimed in claim 1 wherein said message relates to at least a first set and a second set of the plurality of sets of measurements and is transmitted on one of the respective dates determined for the first set and second set of measurements.

7. The management method as claimed in claim 6, wherein the method also comprises transmitting a message relating to at least one of a false set of measurements or a set of redundant measurements on another of the dates determined for one said first and second sets of measurements.

8. The management method as claimed in claim 6, wherein no message is transmitted on another of the respective dates determined for the first and second sets of measurements.

9. The management method as claimed in claim 1, wherein the random distribution law is a uniform distribution law.

10. The management method as claimed in claim 1, wherein the random distribution law is an exponential distribution law.

11. A device for managing transmissions of a plurality of sets of measurements performed iteratively by a measurement sensor capable of communicating with a collection device via a radio network, each set of measurements being performed with a respective iteration at a regular time interval, wherein the device comprises:
  a determination module configured to determine a respective date of transmission for each set of measurements of the plurality of sets of measurements, the determination of said respective date of transmission for each set of measurements comprising a determination of a time window starting from an instant which is a function of a measurement date of one of said sets of measurements, or a function of a determined respective date of transmission of a preceding set of measurements of the plurality of sets of measurements, and a determination of a random value according to a random distribution law over said window, said respective date of transmission being said random value, wherein the determined time window has a length that is greater than said regular time interval; and
  a processing module configured to transmit a message relating to at least one set of measurements over the radio network, on one of the respective dates of transmission determined for the plurality of sets of measurements, wherein the message comprises a measurement report or a request for a measurement report relating to the at least one set of measurements performed by the measurement sensor.

12. A sensor comprising:
  a measurement module configured to perform a plurality of sets of measurements iteratively, each iteration being performed at a regular interval and generating a respective set of measurements of the plurality of sets of measurements; and
  a management device comprising:
    a determination module configured to determine a respective date of transmission for each set of measurements of the plurality of sets of measurements, the determination of said respective date of transmission for each set of measurements comprising a determination of a time window starting from an instant which is a function of a measurement date of one of said sets of measurements, or a function of a determined respective date of transmission of a preceding set of measurements of the plurality of sets of measurements, and a determination of a random value according to a random distribution law over said window, said respective date of transmission being said random value, wherein the determined time window has a length that is greater than said regular time interval; and
    a processing module configured to transmit a message relating to at least one set of measurements over the radio network, on one of the respective dates of transmission determined for the plurality of sets of measurements to a collection device via a radio network.

13. A collection device comprising:
  a management device configured to communicate with a measurement sensor over a radio network, the management device comprising:
    a determination module configured to determine a respective date of transmission for each of a plurality of sets of measurements performed iteratively by the measurement device, each set of measurements being performed with a respective iteration at a regular time interval, the determination of said respective date of transmission for each set of measurements comprising a determination of a time window starting from an instant which is a function of a measurement date of one of said sets of measurements, or a function of a determined respective date of transmission of a preceding set of measurements of the plurality of sets of measurements, and a determination of a random value according to a random distribution law over said window, said respective date of transmission being said random value, wherein the determined time window has a length that is greater than said regular time interval; and
    a processing module configured to transmit a message relating to at least one set of measurements over the radio network, on one of the respective dates of transmission determined for the plurality of sets of measurements.

14. A non-transitory computer-readable storage device comprising a computer program product stored thereon and comprising instructions for implementing a management method when the instructions are loaded and run by a processor, wherein the management method comprises:
  managing transmissions of a plurality of sets of measurements performed iteratively by a measurement sensor communicating with a collection device via a radio network, each set of measurements being performed with a respective iteration at a regular time interval, when the instructions are loaded and run by a processor, wherein managing comprises:

for each set of measurements, determining a respective date of transmission for that set of measurements, the determination of said respective date of transmission for each set of measurements comprising a determination of a time window starting from an instant which is a function of a measurement date of one of said sets of measurements, or a function of a determined date of transmission of a preceding set of measurements of the plurality of sets of measurements, and a determination of a random value according to a random distribution law over said window, said respective date of transmission being said random value, wherein the determined time window has a length that is greater than said regular time interval; and transmitting a message relating to at least one set of measurements over the radio network, on one of the respective dates of transmission determined for the plurality of sets of measurements, wherein the message comprises a measurement report or a request for a measurement report relating to the at least one set of measurements performed by the measurement sensor.

15. A method comprising:

managing transmissions of a plurality of sets of measurements performed iteratively by a measurement sensor communicating with a collection device via a radio network, each set of measurements being performed with a respective iteration at a regular time interval, wherein managing comprises the following acts performed by the collection device:

for each set of measurements of the plurality of sets of measurements, determining a respective date of transmission for that set of measurements, the determination of said respective date of transmission for each set of measurements comprising a determination of a time window starting from an instant which is a function of a measurement date of one of said sets of measurements, or a function of a determined date of transmission of a preceding set of measurements of the plurality of sets of measurements, and a determination of a random value according to a random distribution law over said window, said respective date of transmission being said random value, wherein the determined time window has a length that is greater than said regular time interval; and transmitting by the collection device a message relating to at least one set of measurements over the radio network, on one of the respective dates of transmission determined for the plurality of sets of measurements, wherein the message comprises a request for a measurement report from the measurement sensor relating to the at least one set of measurements performed by the measurement sensor.

* * * * *